11 Claims. (Cl. 260—593)

3,013,081
PURIFICATION OF KETONES

Henry K. Dice, Corpus Christi, Tex., assignor to Celanese Corporation of America, New York, N.Y., a corporation of Delaware
No Drawing. Filed Apr. 3, 1958, Ser. No. 726,043

The present invention relates to the purification of saturated ketones and is more particularly directed to a novel process for removing the unsaturated ketone present as a minor contaminant in a saturated ketone, and for recovering the saturated ketone in high purity.

Although saturated and unsaturated ketones find a number of applications in which both types of ketones may be used in admixture with each other, the presence of even a minor amount of an unsaturated ketone contaminant in the corresponding saturated ketones renders the latter substance almost unusable for certain purposes. One such instance is the employment of methyl-ethyl ketone as a solvent.

The vapors of methyl-ethyl ketone to which workmen commonly become exposed are relatively non-toxic and not unpleasant in odor. Unfortunately the same thing cannot be said for the corresponding unsaturated ketone, namely, methyl-vinyl ketone. Worse, even minor quantities of methyl-vinyl ketone in methyl-ethyl ketone have deleterious effect far out of proportion to the actual degree of contamination. Thus, the presence of from 0.25–1% of methyl-vinyl ketone in otherwise pure methyl-ethyl ketone is sufficient to impart undesirable odor and lachrymatory properties to the methyl-ethyl ketone. Substantially complete absence of the vinyl ketone is therefore desirable, even necessary, for many applications of methyl-ethyl ketone.

Attempts have heretofore been made to separate saturated ketones from mixtures containing the same and the corresponding unsaturated ketones. For instances, such mixtures were subjected to distillation. However, due to the close proximity of the boiling temperature of the corresponding saturated and unsaturated ketones, it was found that effective and substantial separation of the two ketones is highly difficult if not impossible, unless very efficient and complicated distillation units are employed. Thus purifying the ketone is an expensive and cumbersome operation.

Additionally, separation is all the more difficult because substantially complete removal of the unsaturated ketone is often necessary.

To cite an exemplary instance of the problem: samples from a methyl-ethyl ketone containing 0.25% methyl-vinyl ketone were carefully fractionated at a 30 to 1 reflux ratio. After a light ends cut of 7.5% of the charge was taken off, the next 25% cut of the distillate had more than 0.09% of methyl-vinyl ketone content, while subsequent 25% cuts had higher concentrations, averaging over 0.12%. A 4 to 1 reflux ratio fractionation on this sample of the same ketone mixture resulted in 0.16% of methyl-vinyl ketone in the first 25% cut (after a 7.5% light ends cut). This example demonstrates the difficulty of attempting to reduce the contamination by unsaturated ketone by fractionation alone.

There have been prior art suggestions that the unsaturated ketone be chemically reacted to form compounds either more volatile or less volatile than the corresponding saturated ketone. However, although suitable in principle, the methods actually employed by the prior art are cumbersome, requiring for example elevated pressures and temperatures, introduction of large quantities of water, etc. Moreover, the prior art techniques are not at all adapted to the specific problem of substantially eliminating low levels of contamination.

It is therefore the main object of the present invention to provide a simple and efficient process for recovering saturated ketones substantially free from contamination with the corresponding unsaturated ketone.

Another object of the invention is to provide a process whereby saturated ketones may be effectively and economically separated in a substantially pure state and in high yields from a starting material consisting of saturated ketone contaminated by the presence of up to about 1% of the corresponding unsaturated ketone.

Still another object of this invention is to purify methyl-ethyl ketone by removing therefrom the corresponding methyl-vinyl ketone contaminant.

Other objects of the invention will be readily apparent from the following detailed disclosure of the present invention and the claims.

Briefly stated, the process of the instant invention involves treating the contaminated ketone with peracetic acid. The resulting reaction mixture is fractionated to recover therefrom a heart cut substantially free of unsaturated ketone.

Essentially removal of the unsaturated ketone is effected by some chemical reaction thereof with the peracetic acid to form compounds easily separated from the saturated ketone, which is itself substantially unaffected.

The peracetic acid is conveniently supplied as a solution thereof. Thus, solutions of peracetic acid in such solvents, inert to the treatment, as acetic acid, methylal, methyl-ethyl ketone, methyl acetate or acetone, may be employed.

The treatment is facilitated by employment of elevated temperatures, e.g. temperatures within the range of about 40 to 90° C. As a matter of preference, the reaction is effected at the boiling point of the ketone, or close to the boiling point (e.g. within 10° C. of the boiling point). Most conveniently the treatment is effected at atmospheric pressure but higher or lower pressures may be used. To aid in substantially complete removal of the unsaturated ketone an excess of peracetic acid should be employed. Preferably the peracetic acid is employed in quantities ranging from about 1 to 4 moles or more per mole of unsaturated ketone. However, for economic reasons, it is preferred to employ a minimum of peracetic acid, below 2% and preferably not above about 1% by weight of the saturated ketone. Usually the amount of peracetic acid will be above ½% of the weight of the saturated ketone.

Since removal of unsaturated ketone is also attributable to the fractionation step, the treatment and fractionation are component parts of an integrated process capable of being carried out in either batch or continuous fashion. In a batch process a suitable way to effect the treatment would involve adding the appropriate amounts of peracetic acid and ketone to the pot of a still, then refluxing for about ½ hour to 1 hour. At the expiration of this period, the reflux ratio is adjusted from 100% to any desired operating ratio and the purified saturated ketone is distilled off. Any excess peracetic acid is generally decomposed during the process; some may react with a small amount of the saturated ketone to form high boiling compounds.

Because of the close integration of the two steps, a continuous process is equally feasible. Thus, the ketone and the peracetic acid may be proportionately fed either into a holding tank or into a relatively long heated coil, either of which provides a suitable hold-up time (e.g. about ½ hour to 1 hour) for the mixture at temperatures near the bubble point. Since feed stock is normally introduced to a fractionating column at the bubble point, there is no adverse effect on the fractionating column operation. At any rate the reaction and fractionation is thus effected continuously and the purified saturated ketone is recovered continuously.

Substantially the entire treatment may be carried out simultaneously with the fractionation step. Thus, the contaminated ketone and the peracetic acid may be fed to a fractionating column, either at the same intermediate point on the column or at different points, and purified ketone may be taken off overhead, or as an intermediate overhead sidestream.

The invention finds its greatest utility in the treatment of mixtures containing relatively small amounts of unsaturated ketone, for example 1% or less of unsaturated ketone, and containing relatively large amounts, for example, above about 90%, preferably above about 95%, of the saturated ketone. The proportion of the initial feed recovered as high purity product, after the treatment of this invention, is above about 85%, usually above about 95%, e.g. 98%.

For a fuller and more detailed understanding of the instant invention, there follow specific examples illustrating the effect of reaction with peracetic acid, followed by distillation, on the methyl-vinyl ketone content in methyl-ethyl ketone, and demonstrating how substantially complete removal can be attained.

Several runs on a batch basis were made employing a commercially available methyl-ethyl ketone which analyzed 99% methyl-ethyl ketone 0.75% ethyl acetate and 0.25% methyl-vinyl ketone. A thirty tray Oldershaw column was employed throughout, at atmospheric pressure.

The procedure followed was to charge 300 grams of methyl-ethyl ketone and the peracetic acid to the kettle, then reflux for 30–60 minutes and thereafter distill at a 4 to 1 reflux ratio. A 7½% light ends cut (cut 1 in the table below) was discarded and one or more cuts (each 12.5% of charge) were made and analyzed for methyl-vinyl ketone (MVK) by ultraviolet spectrophotometer.

Run 1 was made without peracetic acid and at a 30 to 1 reflux ratio to determine the purification possible by fractionation alone.

Run 2 was made without peracetic (4 to 1 reflux ratio) as a control.

Runs 3 to 8 were made with different amounts of peracetic acid, supplied as a 40% solution thereof in acetic acid.

For run 5 a 60-minute reflux period was used and 25% cuts were taken.

The following table represents the results of the tests.

*Removal of methyl vinyl ketone from methyl ethyl ketone*

| Run | Peracetic Acid, per se, Percent | MVK in Overhead, Percent | | | | | Total Reflux Time, min. | Reflux Ratio |
|---|---|---|---|---|---|---|---|---|
| | | Cut 1 | Cut 2 | Cut 3 | Cut 4 | Cut 5 | | |
| 1 | 0.00 | ----- | 0.090 | 0.098 | 0.110 | 0.120 | 30 | 30/1 |
| 2 | 0.00 | ----- | 0.160 | ----- | ----- | ----- | 30 | 4/1 |
| 3 | 0.29 | ----- | 0.080 | ----- | ----- | ----- | 30 | 4/1 |
| 4 | 0.29 | ----- | 0.085 | ----- | ----- | ----- | 30 | 4/1 |
| 5 | 0.40 | ----- | ª0.070 | ª0.087 | ª0.098 | ----- | 60 | 4/1 |
| 6 | 0.58 | ----- | 0.050 | 0.030 | ----- | ----- | 30 | 4/1 |
| 7 | 0.58 | ----- | 0.042 | 0.048 | 0.050 | 0.052 | 30 | 4/1 |
| 8 | 1.00 | ----- | 0.020 | ----- | ----- | ----- | 30 | 4/1 |

ª Cut weight was 25% of charge.

While the invention has its greatest application in the treatment of methyl-ethyl ketone contaminated with methyl-vinyl ketone, it will be appreciated that it can be employed for the treatment of other saturated ketones contaminated with the corresponding unsaturated ketones. Examples of such materials are methyl isopropyl ketone contaminated with methyl isopropenyl ketone or with ethyl-vinyl ketone; ethyl propyl ketone contaminated with vinyl propyl ketone; methyl isobutyl ketone contaminated with mesityl oxide; as well as methyl amyl ketone, methyl hexyl ketone, ethyl amyl ketone or ethyl hexyl ketone, each contaminated with its corresponding unsaturated ketone. In general, both the saturated and unsaturated ketones are entirely hydrocarbon except for the oxygen of their carbonyl group, the carbon-to-carbon bonds of the saturated ketone consist of single bonds, and the carbon-to-carbon bonds of the unsaturated ketone consist of single bonds and one ethylenic double bond.

It is to be understood that the foregoing detailed description is merely given by way of illustration and that many variations may be made therein without departing from the spirit of my invention.

Having described my invention, what I desire to secure by Letters Patent is:

1. A process for preparing an easily purifiable saturated ketone which comprises contacting with peracetic acid a saturated ketone contaminated by a small amount of the corresponding unsaturated ketone, to react said unsaturated ketone with said peracetic acid to form a reaction product, both of said ketones being entirely hydrocarbon except for the oxygen of their carbonyl group, the carbon-to-carbon bonds of said saturated ketone consisting of single bonds and the carbon-to-carbon bonds of said unsaturated ketone consisting of single bonds and an ethylenic double bond.

2. A process as in claim 1, wherein the unsaturated contaminant amounts to less than 1% of the ketone and where up to about 1% of peracetic acid is employed.

3. A process as in claim 1, wherein the ketone is treated with peracetic acid at refluxing temperatures.

4. Process as set forth in claim 1 wherein the saturated ketone is separated from said reaction product by distillation.

5. A process as in claim 4, wherein substantially pure saturated ketone amounting to about 85 to 98% of the contaminated ketone is recovered as a cut from the distillation.

6. A process as in claim 4, wherein the mole ratio of peracetic acid to unsaturated ketone is in the range of about 1:1 to 4:1.

7. Process as set forth in claim 4 in which methyl-ethyl ketone contaminated with methyl-vinyl ketone is treated.

8. A process for purifying methyl-ethyl ketone which comprises contacting liquid methyl-ethyl ketone contaminated by liquid methyl-vinyl ketone, in an amount which is less than about 1% with up to about 1% of peracetic acid in liquid phase, while heating, and fractionating the mixture to recover therefrom methyl-ethyl ketone substantially free of methyl-vinyl ketone.

9. A process as in claim 8 wherein about ½% to 1% peracetic acid is employed and the contact is effected at refluxing temperatures.

10. A process as in claim 8 wherein a starting material having above 90% methyl-ethyl ketone therein is employed and the recovered methy-ethyl ketone constitutes a cut of about 85 to 98% of the starting material, the temperature being about 40 to 90° C.

11. A process for purifying methyl-ethyl ketone which comprises contacting a starting material comprising more than 90% of methyl-ethyl ketone and containing methyl-vinyl ketone as a contaminant in an amount which is less than 1%, with from ½% to 1% of peracetic acid at a temperature between about 40° and 90° C., and fractionating the mixture to recover therefrom methyl-ethyl ketone substantially free of methyl-vinyl ketone in a cut of about 85 to 98% of the starting material.

References Cited in the file of this patent

UNITED STATES PATENTS 2,355,140    Bludworth _____ Aug. 8, 1944

OTHER REFERENCES

Swern Chem. Reviews, vol. 45, pages 25–28, 32, 41 (1949).